US008122559B2

(12) United States Patent
Hasegawa (10) Patent No.: US 8,122,559 B2
(45) Date of Patent: Feb. 28, 2012

(54) WIPER SYSTEM FOR VEHICLE

(75) Inventor: Takashi Hasegawa, Kosai (JP)

(73) Assignee: ASMO Co., Ltd., Shizuoka-pref. (JP)

( * ) Notice: Subject to any disclaimer, the term of this patent is extended or adjusted under 35 U.S.C. 154(b) by 916 days.

(21) Appl. No.: 12/213,896

(22) Filed: Jun. 26, 2008

(65) Prior Publication Data

US 2009/0007362 A1 Jan. 8, 2009

(30) Foreign Application Priority Data

Jul. 4, 2007 (JP) ................. 2007-176338

(51) Int. Cl.
*B60S 1/06* (2006.01)
*B60S 1/24* (2006.01)
(52) U.S. Cl. ............... 15/250.29; 15/250.27; 15/250.31
(58) Field of Classification Search ............ 15/250.21, 15/250.29, 250.27, 250.31
See application file for complete search history.

(56) References Cited

U.S. PATENT DOCUMENTS

| 6,564,419 B2 | 5/2003 | Matsumoto et al. | |
|---|---|---|---|
| 2003/0024064 A1* | 2/2003 | Heinrich et al. | 15/250.21 |

FOREIGN PATENT DOCUMENTS

| JP | U-7-5999 | | 1/1995 |
|---|---|---|---|
| JP | A-2005-82027 | | 3/2005 |
| JP | 2006176014 A | * | 7/2006 |

* cited by examiner

*Primary Examiner* — Monica Carter
*Assistant Examiner* — Stephanie Newton
(74) *Attorney, Agent, or Firm* — Posz Law Group, PLC (57) ABSTRACT

A wiper motor has an output shaft, which is reciprocally pivoted forward and backward upon energization of the wiper motor and outputs a drive force for driving first and second wiper arms. A crank arm is integrally pivotably fixed to the output shaft. First and second connecting rods are pivotably connected to first and second connecting points, respectively, of the crank arm. A first lever arrangement is connected between the first connecting rod and the first wiper arm to reciprocally pivot the first wiper arm upon reciprocal movement of the first connecting rod. A second lever arrangement is connected between the second connecting rod and the second wiper arm to reciprocally pivot the second wiper arm upon reciprocal movement of the second connecting rod.

10 Claims, 6 Drawing Sheets

WIPER SYSTEM FOR VEHICLE

CROSS REFERENCE TO RELATED APPLICATION

This application is based on and incorporates herein by reference Japanese Patent Application No. 2007-176338 filed on Jul. 4, 2007.

BACKGROUND OF THE INVENTION

1. Field of the Invention

The present invention relates to a wiper system for a vehicle.

2. Description of Related Art

For example, Japanese Unexamined Utility Model Publication No. H07-5999 and Japanese Unexamined Patent Publication No. 2005-82027 disclose wiper systems for a vehicle. Specifically, the wiper system of Japanese Unexamined Utility Model Publication No. H07-5999 is an opposed wiper system, which has two wiper arms reciprocally pivoted in opposite directions, respectively. In this wiper system, a crank arm is connected to an output shaft of a wiper motor, and an intermediate link is connected to the crank arm through a connecting rod. A longitudinal center of the intermediate link is pivotably supported, and two drive rods are connected to end portions, respectively, of the intermediate link. A corresponding drive lever, to which a corresponding wiper arm is fixed, is connected to each drive rod.

When the output shaft of the motor is continuously rotated in the single direction, the rotational force of the motor is conducted to the intermediate link through the crank arm and the connecting rod, so that the intermediate link is reciprocally pivoted. Through the reciprocal pivotal movement of the intermediate link, the drive rods are reciprocated to reciprocally pivot the drive levers and the wiper arms.

In the case of the wiper system recited in Japanese Unexamined Patent Publication No. 2005-82027, a crank arm is connected to an output shaft of a wiper motor, and a pivot lever is connected to the crank arm through a link. A pivot shaft, to which one wiper arm is fixed, is provided to the pivot lever. A four-bar linkage is connected to the pivot lever through a link, and the other wiper arm is fixed to this four-bar linkage.

When the output shaft of the wiper motor is continuously rotated in the single direction, the rotational force of the wiper motor is conducted to the pivot lever and the four-bar linkage through the crank arm and the link to reciprocally pivot the pivot lever and each link of the four-bar linkage to reciprocally pivot the wiper arms.

In the case of the opposed wiper system recited in Japanese Unexamined Utility Model Publication No. H07-5999, the intermediate link is required to pivot the wiper arms in opposite directions, respectively. Furthermore, in order to reciprocally pivot the intermediate link, the crank arm and the connecting rod need to be provided between the motor and the intermediate link. Thus, in order to reduce the number of components and to reduce the costs, further improvements are required.

Furthermore, in the case of the wiper system recited in Japanese Unexamined Patent Publication No. 2005-82027, the four-bar linkage is provided to the one of the two wiper arms. Thus, in order to coincide the wiping directions of the two wiper arms with each other, the main lever, which forms the four-bar linkage at the one wiper arm, needs to be pivoted in the direction opposite from that of the pivot lever of the other wiper arm. Also, the main lever and the sub-lever, which form the four-bar linkage, need to be placed on the side opposite from the pivot lever of the other wiper arm in the transverse direction of the system (in a front-to-rear direction of the vehicle). That is, the main lever and the sub-lever of the four-bar linkage are placed at the rear side in the front-to-rear direction of the vehicle, and the pivot lever at the other wiper arm is placed at the front side in the front-to-rear direction of the vehicle. However, in such a case, the size of the entire system having the pivot lever and the four-bar linkage is disadvantageously increased. Thus, in order to reduce the size of the entire system in the transverse direction of the system, further improvements are required.

SUMMARY OF THE INVENTION

The present invention addresses the above disadvantages. Thus, it is an objective of the present invention to provide a wiper system of a vehicle, which enables a reduction in the number of components and a reduction in the costs.

It is another objective of the present invention to provide a wiper system of a vehicle, which enables a reduction in a size of the entire system.

To achieve the objectives of the present invention, there is provided a wiper system for a vehicle, including first and second wiper arms, a wiper motor, a crank arm, first and second connecting rods, a first lever arrangement and a second lever arrangement. The first and second wiper arms are placed one after another in a longitudinal direction of the wiper system. The wiper motor includes an output shaft, which is reciprocally pivoted forward and backward upon energization of the wiper motor and outputs a drive force for driving the first and second wiper arms. The crank arm is integrally pivotably fixed to the output shaft. The first and second connecting rods are pivotably connected to first and second connecting points, respectively, of the crank arm. The first and second connecting points are located on opposite sides, respectively, about a fixing point of the crank arm that is fixed to the output shaft, and the first and second connecting rods are reciprocally moved when the crank arm is reciprocally pivoted forward and backward by the output shaft. The first lever arrangement is connected between the first connecting rod and the first wiper arm. The first lever arrangement reciprocally pivots the first wiper arm relative to a body of the vehicle when the first connecting rod is reciprocally moved. The second lever arrangement is connected between the second connecting rod and the second wiper arm. The second lever arrangement reciprocally pivots the second wiper arm relative to the body of the vehicle when the second connecting rod is reciprocally moved.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

Figure 1:
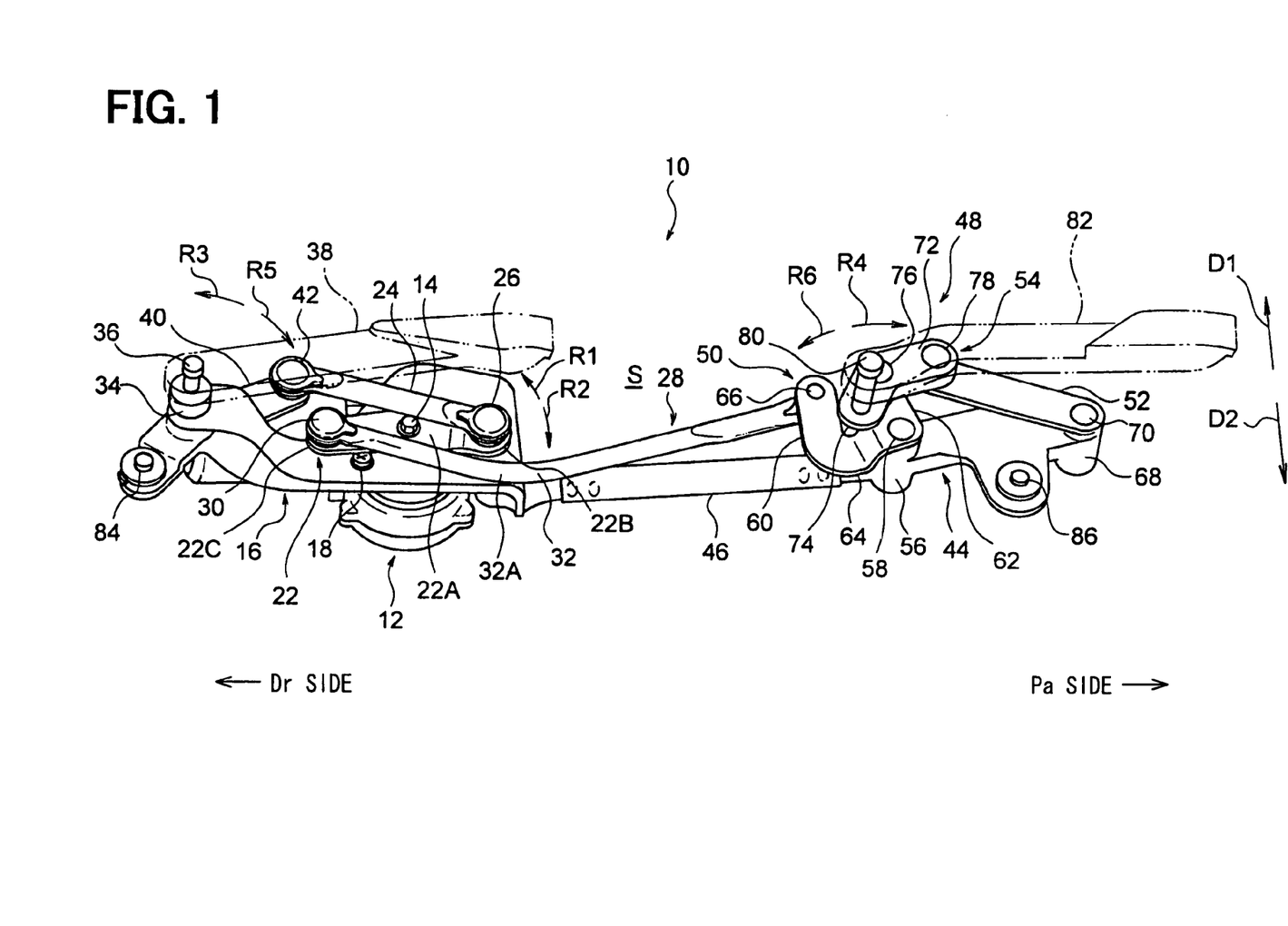
FIG. 1 is a perspective view of a wiper system according to an embodiment of the present invention taken from a vehicle front top side, showing one operational state of the wiper system.
Figure 2:
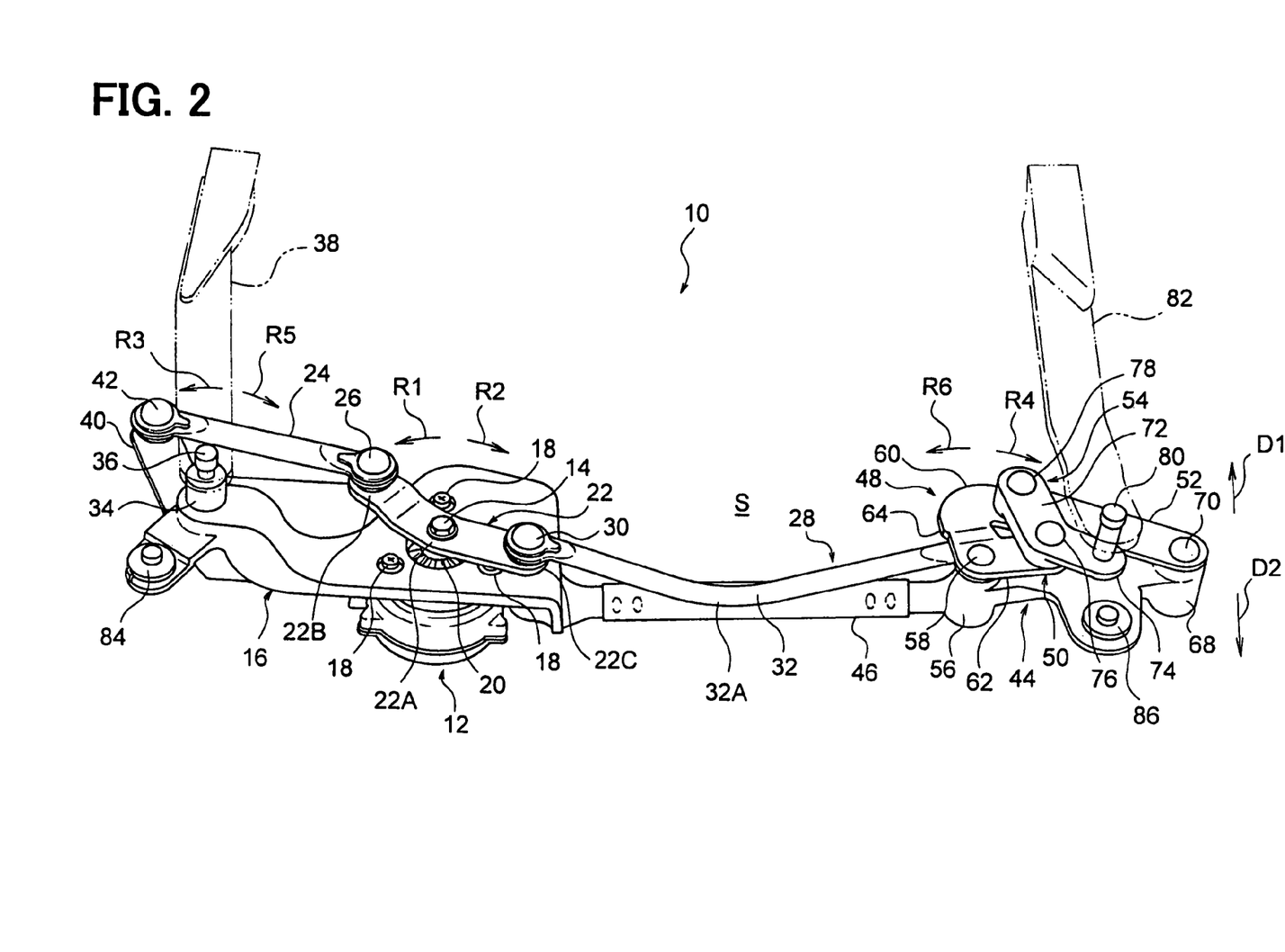
FIG. 2 is a perspective view of the wiper system showing another operational state of the wiper system.
Figure 3:
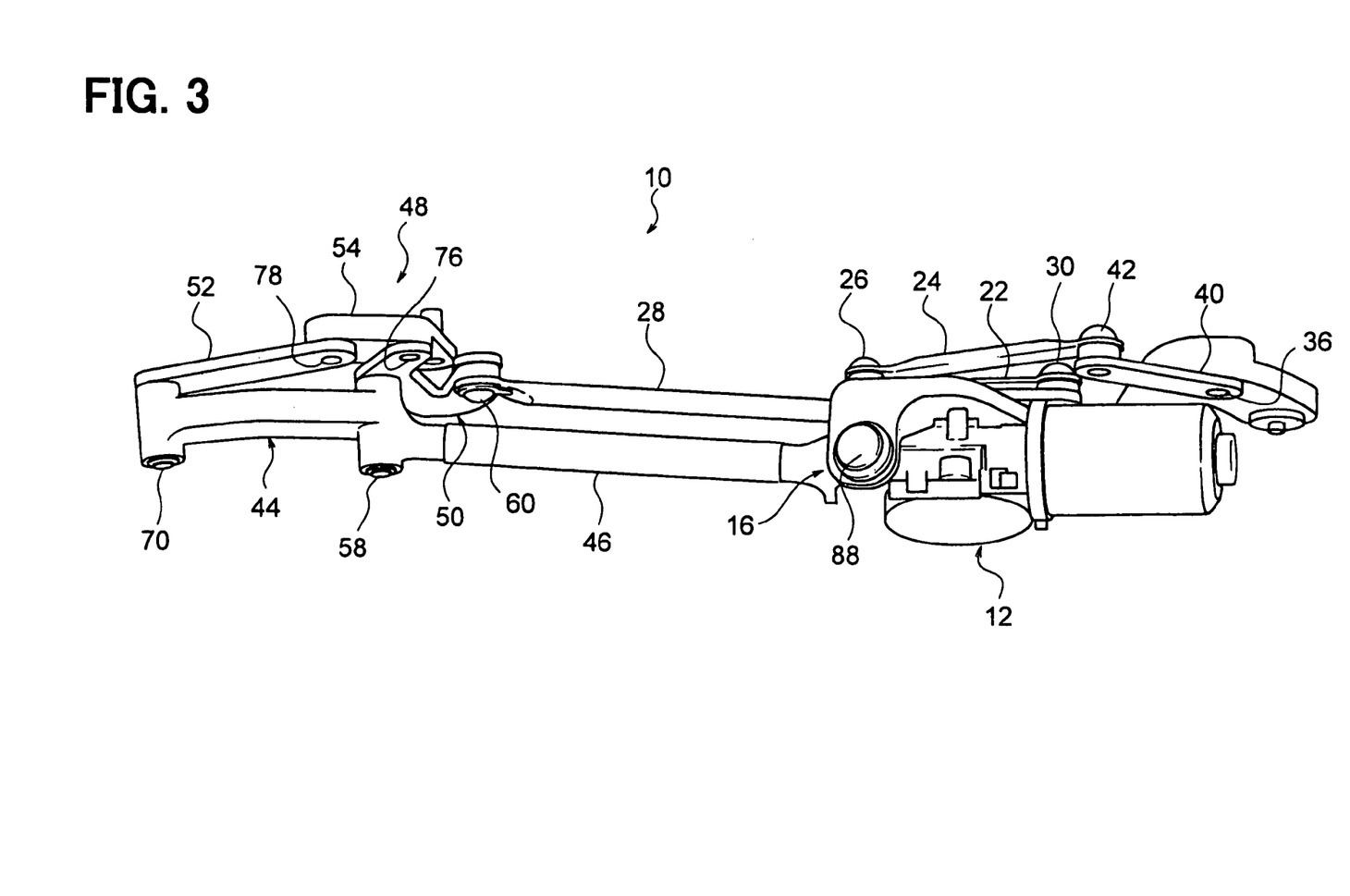
FIG. 3 is a perspective view of the wiper system taken from a vehicle rear bottom side.

FIGS. 1 to 3 show a wiper system 10 of a vehicle according to the embodiment of the present invention. FIGS. 1 and 2 are perspective views of the wiper system 10 seen from a front top side thereof upon installation on a vehicle. FIG. 3 is a perspective view of the wiper system 10 seen from a rear bottom side thereof upon installation on the vehicle. Furthermore, in FIGS. 1 and 3, two wiper arms (first and second wiper arms) 38, 82 of the wiper system 10 are respectively placed one after another in the longitudinal direction of the wiper system (hereinafter, also simply referred to as the system) 10 at a lower turning position in a wiping path (a pivoting path) thereof. In FIG. 2, the wiper arms 38, 82 are respectively positioned at an upper turning position in the wiping path thereof.

The wiper system 10 shown in these drawings is installed at a lower edge of a front window glass (a windshield) to wipe the front window glass and includes a wiper motor 12. The wiper motor 12 is a motor having a speed reducing mechanism. The wiper motor 12 has an output shaft 14, which is reciprocally pivotable forward and backward in both of a forward direction and a backward direction. The wiper motor 12 is placed below a first frame member 16, which is located on a driver seat side (a Dr side in the drawing) of the wiper system 10. The wiper motor 12 is fixed integrally to the first frame member 16 by fixing elements 18.

The output shaft 14 is received in a through hole 20, which extends through the first frame member 16 in the vertical direction, from a lower side of the frame member 16 and projects on an upper side of the first frame member 16. A center portion 22A of an elongated crank arm 22 is integrally rotatably fixed to a distal end portion of the output shaft 14.

One end portion (one connecting point) 22B of the crank arm 22 is displaced from the center portion 22A on one side (an upper side) of the center portion 22A in an axial direction of the output shaft 14. One end portion of a first connecting rod 24 is pivotably connected to the one end portion 22B of the crank arm 22 through a connecting shaft 26. One end portion of a second connecting rod 28 is pivotably connected to the other end portion (the other connecting point) 22C of the crank arm 22 through a connecting shaft 30.

The first connecting rod 24 and the second connecting rod 28 are connected to the crank arm 22 on one axial side of the crank arm 22 in the axial direction of the output shaft 14 (the vertical direction of the vehicle). The second connecting rod 28 includes a bent portion 32 at a longitudinal intermediate part of the second connecting rod 28. The bent portion 32 limits interference between the second connecting rod 28 and the first connecting rod 24 upon the reciprocal pivotal movement of the crank arm 22 in the forward and backward directions.

The bent portion 32 is bent in a direction that is perpendicular to the axial direction of the output shaft 14 (specifically, toward the other side in the transverse direction of the system, which is perpendicular to the longitudinal direction of the system in the horizontal plane, i.e., toward the front side in the front-to-rear direction of the vehicle, as indicated by the arrow D2 in the drawing). That is, the bent portion 32 is bent such that an apex 32A of the bent portion 32 is placed on the side (the front side of the vehicle) of the connecting shafts 30, 66 (located at the opposed end portions, respectively, of the second connecting shaft 28) in the direction perpendicular to the axial direction of the output shaft 14.

A first pivot holder 34 is formed integrally in the first frame member 16 to pivotably support the first pivot shaft 36. A base end portion of the wiper arm 38 (a driver side wiper arm at the Dr side in the drawing) is integrally pivotably fixed to the first pivot shaft 36.

A base end portion of a pivot lever 40 is integrally pivotably fixed to the first pivot shaft 36. The pivot lever 40 is placed on one side of the pivot shaft 36 in the transverse direction of the system (a rear side of the pivot shaft 36 in the front-to-rear direction of the vehicle, as indicated by the arrow D1 in the drawing). The other end portion of the first connecting rod 24 is pivotably connected to a swing end portion of the pivot lever 40 thorough a connecting shaft 42.

A second frame member 44 is placed at a front passenger seat side (a Pa side in the drawing) of the wiper system 10. The second frame member 44 and the first frame member 16 are connected to each other through a connecting frame 46 and are integrally fixed to the vehicle body. The opposed end portions (connecting points) of the second connecting rod 28 are further spaced from the connecting frame 46 in comparison to the apex 32A of the bent portion 32, as best seen in FIG. 2.

The second frame member 44 is provided integrally with a main lever 50, a sub-lever 52 and a connecting lever 54, which form a four-bar linkage 48. Specifically, a second pivot holder 56 is formed integrally at the center of the second frame member 44 (the center in a longitudinal direction of the system, i.e., in a width direction of the vehicle). A second pivot shaft 58 (corresponding to a first rotational shaft of the present invention) is pivotably supported by the second pivot holder 56.

The main lever 50 is placed on the one side of the second pivot shaft 58 in the transverse direction of the system (the rear side of the second pivot shaft 58, as indicated by the arrow D1 in the drawing). The main lever 50 is configured into a generally U-shape in its plan view and includes a first lever portion 60, a second lever portion 62 and a connecting lever portion 64. The first lever portion 60 and the second lever portion 62 are generally parallel to each other. The connecting lever portion 64 connects between the first lever portion 60 and the second lever portion 62.

The other end portion of the second connecting rod 28 is pivotably connected to a swing end portion of the first lever portion 60 through a connecting shaft 66. A base end portion of the second lever portion 62 is integrally pivotably connected to the second pivot shaft 58. The second lever portion 62 is displaced from the first lever portion 60 on the one side of the first lever portion 60 in the axial direction of the second pivot shaft 58 (on the upper side of the first lever portion 60 in the vertical direction of the vehicle).

A driven-side shaft holder 68 is formed integrally with the second frame member 44 on the outer side in the longitudinal direction of the system (i.e., the outer side on the front passenger seat side of the vehicle). A driven-side shaft 70 (serving as a second rotational shaft of the present invention) is pivotably supported by the driven-side shaft holder 68. The sub-lever 52 is placed on the one side of the driven-side shaft 70 in the transverse direction of the system (i.e., the rear side of the driven-side shaft 70 in the front-to-rear direction of the vehicle indicated by the arrow D1 in the drawing). A base end portion of the sub-lever 52 is integrally pivotably fixed to the driven-side shaft 70.

The connecting lever 54 includes an elongated lever main body portion 72 and an extended portion 74. The extended portion 74 extends from one end of the lever main body portion 72. The ends of the lever main body portion 72 are pivotably connected to the swing end portion of the second lever portion 62 and the swing end portion of the sub-lever 52, respectively, through the connecting shafts 76, 78. The other wiper arm 82 at the front passenger seat side (the Pa side) is integrally fixed to an extended end portion of the extended portion 74.

The wiper system 10 is installed to the vehicle body through fixing portions 84, 86, 88, which are provided to the first frame member 16 and the second frame member 44.

In the present embodiment, the first pivot shaft 36 and the pivot lever 40 form a first lever arrangement of the present invention. The main lever 50, the sub-lever 52, the connecting lever 54, the second pivot shaft 58, the driven-side shaft 70 and the connecting shafts 76, 78 form a second lever arrangement of the present invention.

The wiper system 10 provides the following advantages. The operation of the wiper system 10 and advantages thereof will be described below.

Specifically, in the wiper system 10 of the present embodiment, the output shaft 14 of the wiper motor 12 is reciprocally pivoted forward and backward in both directions (the direction of the arrow R1 and the direction of the arrow R2). Thereby, the crank arm 22 is reciprocally pivoted forward and backward in both directions, so that the first connecting rod 24 and the second connecting rod 28 are reciprocated in opposite directions, respectively, in the longitudinal direction of the system. Furthermore, when the first connecting rod 24 and the second connecting rod 28 are reciprocated in the opposite directions, respectively, the pivot lever 40 and the main lever 50 are reciprocally pivoted in opposite directions, respectively.

More specifically, the first connecting rod 24 and the second connecting rod 28, which are pivotably connected to the opposed end portions, respectively, of the crank arm 22, are reciprocated in the opposite directions, respectively, upon the reciprocal pivotal movement of the crank arm 22. The pivot lever 40 and the main lever 50 are respectively connected to the first connecting rod 24 and the second connecting rod 28 and are provided on the one side of the system in the transverse direction of the system (i.e., the rear side in the front-to-rear direction of the vehicle indicated by the arrow D1 in the drawing). The pivot lever 40 and the main lever 50 are reciprocally pivoted in the opposite directions, respectively, upon the reciprocal movement of the first connecting rod 24 and the second connecting rod 28. Specifically, when the pivot lever 40 is pivoted toward the one side (the direction of the arrow R3 in the drawing), the main lever 50 is pivoted toward the other side (the direction of the arrow R4 in the drawing). Also, when the pivot lever 40 is pivoted toward the other side (the direction of the arrow R5 in the drawing), the main lever 50 is pivoted toward the one side (the direction of the arrow R6 in the drawing).

Here, the main lever 50, the sub-lever 52 and the connecting lever 54, which reciprocally pivot the other wiper arm 82, form the four-bar linkage 48. Therefore, as discussed above, when the main lever 50 and the pivot lever 40 are reciprocally pivoted in the opposite directions, respectively, the wiper arms 82, 38 are reciprocally pivoted in the same common wiping direction. Thereby, the front window glass of the vehicle is wiped through the reciprocal pivotal movement of the respective wiper arms 38, 82. At this time, due to the use of the four-bar linkage 48, the wiping range of the other wiper arm 82 can be advantageously increased.

Furthermore, the connecting shaft 80, to which the front passenger seat side wiper arm 82 is fixed, is reciprocated in the longitudinal direction (the width direction of the vehicle) of the system upon the wiping movement. Thus, at the time of stopping the wiper arm 82 in the stop position, the wiper arm 82 is placed at the inner side in the longitudinal direction of the system (the inner side in the width direction of the vehicle). In this way, the distal end of the undepicted wiper blade, which is connected to the distal end portion of the wiper arm 82, will not interfere with the A-pillar (the front window frame) of the vehicle.

Furthermore, the pivot lever 40 (for reciprocally pivoting the wiper arm 38) and the main lever 50 and the sub-lever 52 (for reciprocally pivoting the other wiper arm 82) are respectively placed on the one side of the system about the corresponding shaft thereof in the transverse direction of the system (i.e., the rear side in the front-to-rear direction of the vehicle indicated by the arrow D1). Therefore, the size of the entire system in the transverse direction of the system can be reduced, and thereby the system can be made compact in the transverse direction of the system.

As discussed above, in the wiper system 10 of the present embodiment, even in the case where the four-bar linkage 48 is used to reciprocally pivot the other wiper arm 82, the reciprocal pivotal movement of the crank arm 22 in both directions can obviate the need for placing the pivot lever 40 on the side opposite from the main lever 50 and the sub-lever 52 in the transverse direction of the system. That is, the pivot lever 40, the main lever 50 and the sub-lever 52 can be all placed at the one side in the transverse direction of the system (i.e., the rear side in the front-to-rear direction of the vehicle indicated by the arrow D1 in the drawing). In this way, the entire size of the system can be reduced in the transverse direction of the system.

Furthermore, the wiper system 10 of the present embodiment has the wiper motor 12, which has the output shaft 14 that is reciprocally pivotable in both directions. The output shaft 14 of the wiper motor 12 is directly fixed to the crank arm 22. Therefore, the crank arm 22 can be pivoted in both directions. As a result, with the simple structure, the connecting rods 24, 28 can be reciprocated in the opposite directions, respectively, by reciprocally pivoting the crank arm 22 within the predetermined pivot range. Thereby, it is not required to place any intermediate link as well as any connecting rod between the wiper motor 12 and the crank arm 22. In this way, it is possible to reduce the number of components and the costs.

Furthermore, the output shaft 14 of the wiper motor 12 extends through the first frame member 16, which supports the wiper motor 12. The wiper motor 12 and the crank arm 22 are placed on the opposite sides (the upper side and the lower side), respectively, of the first frame member 16 in the axial direction of the output shaft 14. Thus, even in the case where the crank arm 22 is pivoted in both directions upon the pivotal movement of the output shaft 14 in both directions, it is possible to limit the interference between the crank arm 22 and the wiper motor 12.

The one end portion 22B of the crank arm 22, which forms the connection to the first connecting rod 24, is displaced from the center portion 22A, which forms the fixing portion to the output shaft 14, on the one side in the axial direction (i.e., the upper side in the vertical direction of the vehicle). Thus, it is possible to limit the interference between the first connecting rod 24 and the output shaft 14 in the present embodiment where the distal end portion of the output shaft 14 projects from the crank arm 22, and the first connecting rod 24 and the second connecting rod 28 are reciprocated upon the pivotal movement of the crank arm 22 in both directions. This is particularly true in the case where the wiper arms 38, 82 are placed at the lower turning position as shown in FIG. 1.

Furthermore, the first connecting rod 24 and the second connecting rod 28 are connected to the crank arm 22 on the one side of the crank arm 22 in the axial direction of the output shaft 14 (i.e., in the vertical direction of the vehicle), and the second connecting rod 28 has the bent portion 32 at the longitudinal intermediate portion thereof. Therefore, in the case where the first connecting rod 24 and the second connecting rod 28 are reciprocated upon the pivotal movement of the crank arm 22 in both directions, it is possible to limit the interference between the first connecting rod 24 and the second connecting rod 28. This is true particularly in the case where the wiper arms 38, 82 are placed at the lower turning position as shown in FIG. 1.

Furthermore, the bent portion 32 is bent in the direction that is perpendicular to the axial direction of the output shaft 14 (specifically, toward the other side in the transverse direction of the system, i.e., toward the front side in the front-to-rear direction of the vehicle, as indicated by the arrow D2 in the drawing). Therefore, the size of the system can be reduced in the axial direction of the shaft 14 in comparison to the case where the first connecting rod 24 and the second connecting rod 28 are placed one after another in the axial direction of the output shaft 14 to avoid the interference between the first connecting rod 24 and the second connecting rod 28, or the case where the bent portion 32 is bent toward the one side in the axial direction of the output shaft 14 (i.e., toward the upper side in the vertical direction of the vehicle) to avoid the interference between the first connecting rod 24 and the second connecting rod 28.

Furthermore, when the bent portion 32 is formed in the second connecting rod 28, it is possible to provide an accommodation space S, which corresponds to an amount of offset of the bent portion 32 and is for accommodating another component(s).

Also, in the main lever 50, which forms the four-bar linkage 48, the second lever portion 62, which is pivotably connected to the connecting lever 54, is displaced from the first lever portion 60, which is pivotably connected to the second connecting rod 28, on the one side of the first lever portion 60 in the axial direction of the output shaft 14 (i.e., on the upper side of the first lever portion 60 in the vertical direction of the vehicle). Therefore, even in the case where the main lever 50 is reciprocably pivoted upon the pivotal movement of the crank arm 22 in both directions, particularly, even in the case where the two wiper arms 38, 82 are placed at the upper return position shown in FIG. 2, it is possible to limit the interference between the second connecting rod 28, which is connected to the first lever portion 60, and the sub-lever 52, which is connected to the second lever portion 62 through the connecting lever 54.

Furthermore, in the connecting lever 54, which forms the four-bar linkage 48 in the wiper system 10 of the present embodiment, the extended portion 74 extends from the lever main body portion 72, which is connected to the main lever 50 and the sub-lever 52. The other wiper arm 82 is integrally pivotably connected to the extended portion 74.

Here, for instance, in a case of changing the wiping range of the other wiper arm 82 due to, for example, a change in the vehicle specification, it is only required to change the length, the angle and/or the like of the extended portion 74 without a need for changing the main lever 50 and the sub-lever 52, i.e., it is only required to change the connecting lever 54. Furthermore, in the case of changing the other wiper arm 82 itself due to the change in the vehicle specification, it is only required to change the wiper arm 82 itself without a need for changing the main lever 50, the sub-lever 52 and the connecting lever 54. In this way, the wiping range of the other wiper arm 82 and the wiper arm 82 itself can be easily changed while minimizing the change of the other component(s).

Figure 4:
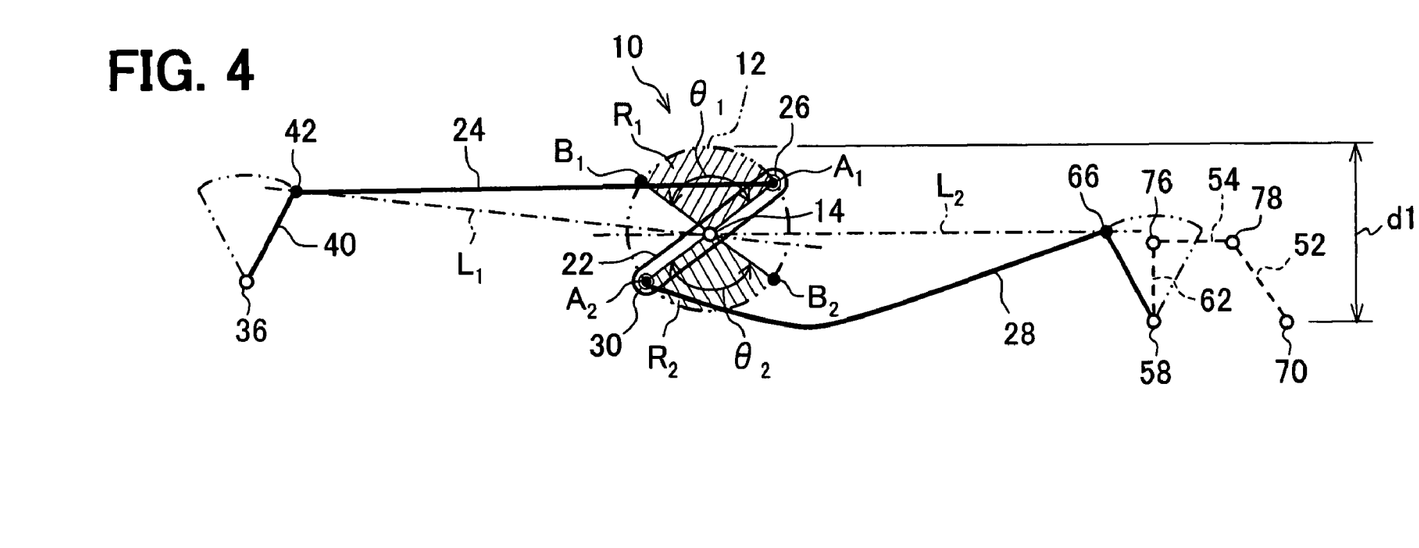
FIG. 4 is a schematic diagram showing the wiper system of the embodiment.
Figure 5:
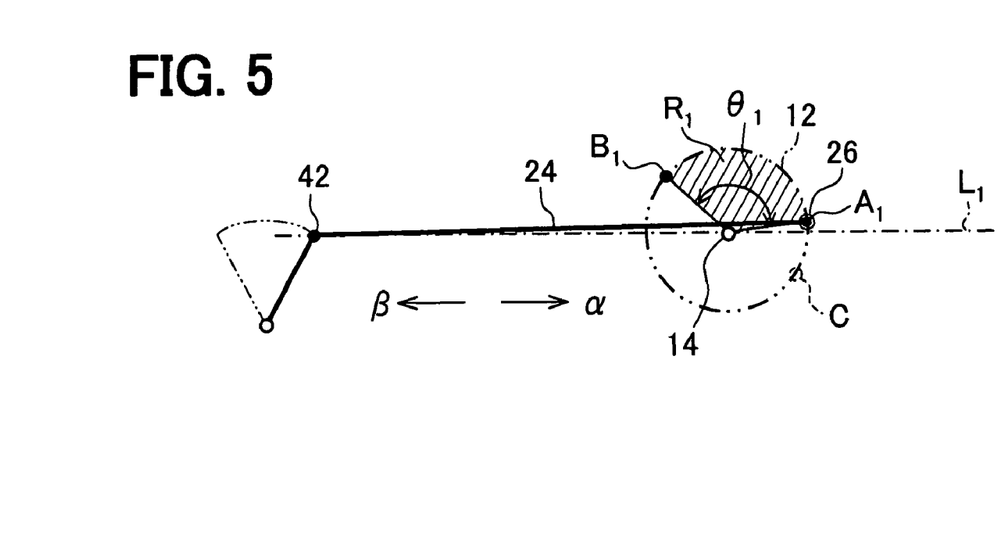
FIG. 5 is a schematic diagram showing a portion of FIG. 4.

Now, with reference to FIGS. 4 and 5, the setting of the pivot range of the crank arm 22 (and thereby of the output shaft 14) will be described. When the output shaft 14 is reciprocally driven upon the energization of the wiper motor 12, the connecting shaft 26, which is connected to the one end portion of the first connecting rod 24 at the crank arm 22, is reciprocally moved between a point $A_1$ and a point $B_1$ within a predetermined angular range (pivot range) $R_1$ that has a predetermined angle $\theta_1$ (less than 180 degrees), so that the first connecting rod 24 is reciprocally moved in a direction of an arrow α and a direction of an arrow β to drive the wiper arm 38 (FIG. 5). Here, the predetermined angle $\theta_1$ is set such that the connecting shaft 26 is reciprocally moved without crossing an imaginary line $L_1$ that connects between an axis of the output shaft 14 and an axis of the connecting shaft 42, to which the other end portion of the first connecting rod 24 is connected. This setting is due to the following reason. That is, with reference to FIG. 5, which shows only the first connecting rod 24 and its associated components without depicting the crank arm 22 and the other components for the sake of simplicity, it is now assumed that the connecting shaft 26 is reciprocally moved between the point $B_1$ and a point C, which is beyond the line $L_1$. In this case, when the connecting shaft 26 moves from the point C to the line $L_1$, the connecting shaft 26 is moved in the direction of the arrow α. Then, after the line $L_1$, the connecting shaft 26 is moved in the direction of the arrow β. Therefore, the moving direction of the connecting shaft 26 is shifted at the line $L_1$. This may possibly result in generation of additional noise (mechanical hitting noise) at the shift location on the line $L_1$. The above setting of the angular range $R_1$ without crossing the line $L_1$ eliminates the generation of the shift motion at the shift location on the line $L_1$.

Similar to the connecting shaft 26, the connecting shaft 30, which is connected to the second connecting rod 28 at the crank arm 22, is reciprocally moved between a point $A_2$ and a point $B_2$ within a predetermined angular range (pivot range) $R_2$ that has a predetermined angle $\theta_2$ (less than 180 degrees) without crossing an imaginary line $L_2$, which connects between the axis of the output shaft 14 and an axis of the connecting shaft 66, so that the second connecting rod 28 is reciprocally moved to drive the wiper arm 82. Here, the angle $\theta_2$ is generally the same as the angle $\theta_1$.

Figure 6:
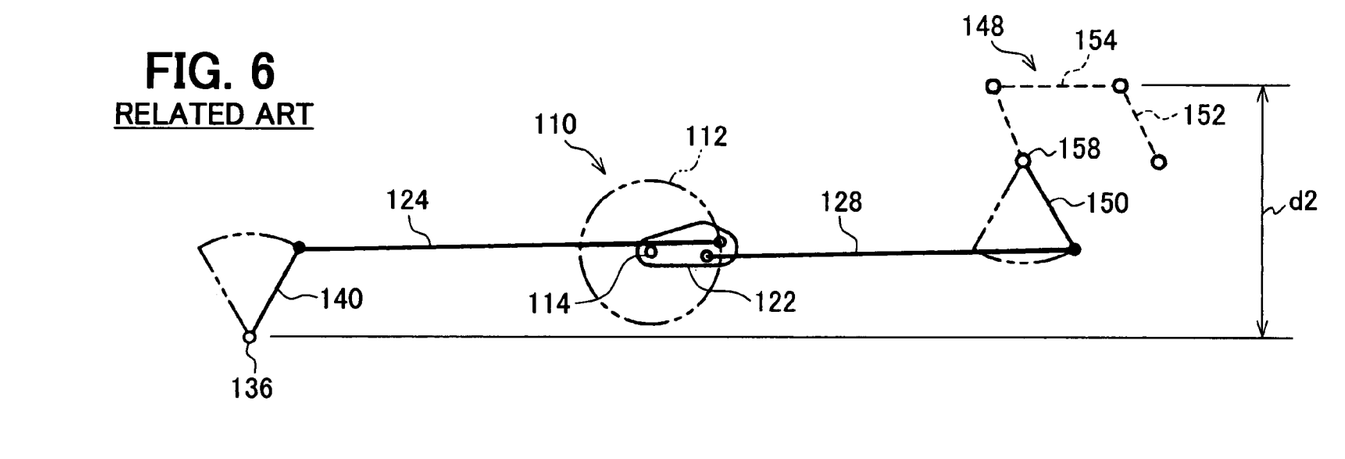
FIG. 6 is a schematic diagram showing a comparative wiper system of a related art.

Now, a comparative example of a related art shown in FIG. 6 will be described to illustrate the advantage of the present embodiment. In the comparative wiper system 110 shown in FIG. 6, one end portion of the crank arm 122 is integrally rotatably fixed to an output shaft 114 (the output shaft 114 being continuously rotated in one direction). One end portion of a first connecting rod 124 and one end portion of a second connecting rod 128 are rotatably connected to the other end portion of the crank arm 122 (thereby implementing a double swing type).

The other end portion of the first connecting rod 124 is pivotably connected to a swing end portion of the pivot lever 140, which is integrally pivotably connected to the first pivot shaft 136, and the other end portion of the second connecting rod 128 is pivotably connected to a swing end portion of the main lever 150, which is integrally pivotably connected to a second pivot shaft 158.

The main lever 150 cooperates with a sub-lever 152 and a connecting lever 154 to form a four-bar linkage 148. The main lever 150 and the sub-lever 152 are arranged on an opposite side with respect to the pivot lever 140 in the transverse direction of the system to coincide wiping directions of two wiper arms (not shown) with each other.

In this case, a dimension d2 of the entire system in the transverse direction of the system including the pivot lever 140 and the four-bar linkage 148 becomes relatively large.

Figure 7:
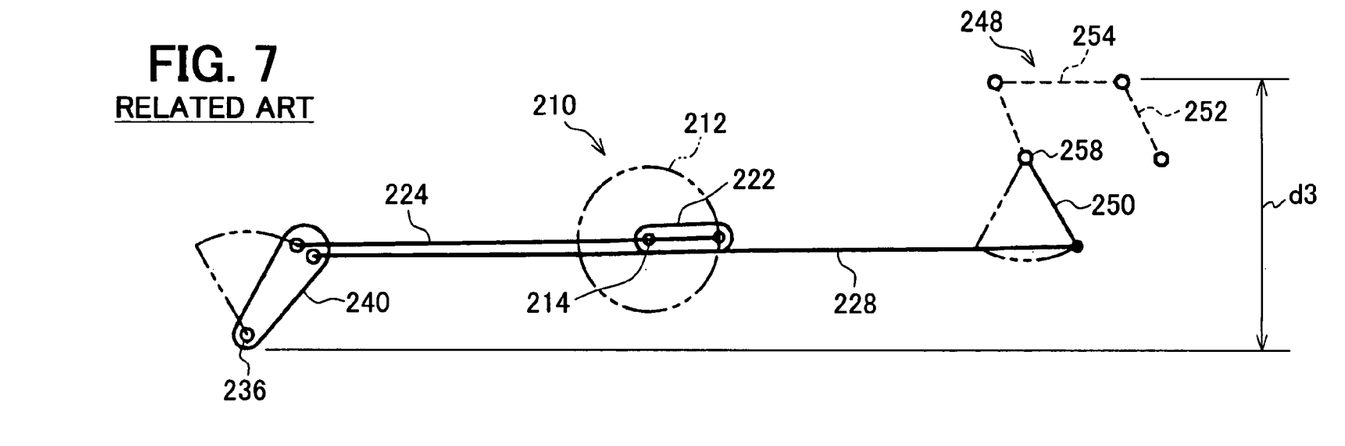
FIG. 7 is a schematic diagram showing another comparative wiper system of another related art.

Furthermore, in another comparative wiper system 210 of another related art shown in FIG. 7, one end portion of the crank arm 222 is integrally pivotably fixed to an output shaft 214 of the wiper motor 212 (the output shaft 214 being continuously rotated in one direction). One end portion of the first connecting rod 224 is pivotably connected to the other end portion of the crank arm 222.

The other end portion of the first connecting rod 224 is pivotably connected to a swing end portion of a pivot lever 240, which is integrally pivotably fixed to a first pivot shaft 236. One end portion of a second connecting rod 228 is pivotably connected to the swing end portion of the pivot lever 240. The other end portion of the second connecting rod 228 is pivotably connected to a swing end portion of a main lever 250, which is integrally pivotably fixed to a second pivot shaft 258 (thereby serving as a return type).

The main lever 250 cooperates with a sub-lever 252 and a connecting lever 254 to form a four-bar linkage 248. The main lever 250 and the sub-lever 252 are arranged on an opposite side with respect to the pivot lever 240 in the transverse direction of the system to coincide wiping directions of two wiper arms (not shown) with each other.

In this case, a dimension d3 of the entire system in the transverse direction of the system including the pivot lever 240 and the four-bar linkage 248 becomes relatively large.

In contrast to the above comparative cases, in the wiper system 10 of the present embodiment, it is not required to place the main lever 50 and the sub-lever 52 on the opposite side with respect to the pivot lever 40. Specifically, in the wiper system 10 of the present embodiment, all of the pivot lever 40, the main lever 50 and the sub-lever 52 can be placed on the one side of the system in the transverse direction of the system. In this way, the entire size d1 (see FIG. 4) of the system can be reduced in the transverse direction of the system (d1<d2, d3).

Although the present invention is described with reference to the above embodiment, the present invention is not limited to the above embodiment. Specifically, the above embodiment may be modified in various ways without departing from the spirit and scope of the present invention.

For example, in the above embodiment, the four-bar linkage 48 is used to reciprocally pivot the other wiper arm 82, and the wiping directions of the two wiper arms 38, 82 coincide with each other (i.e., serving as a tandem wiper system).

Figure 8A:
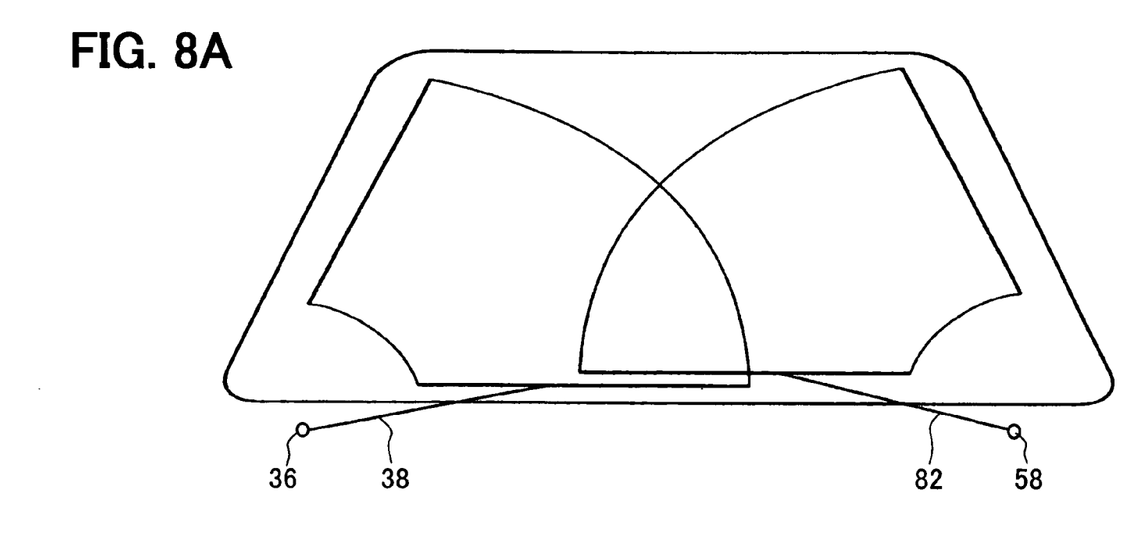
FIGS. 8A and 8B are diagrams showing a modification of the wiper system of the embodiment.
Figure 8B:
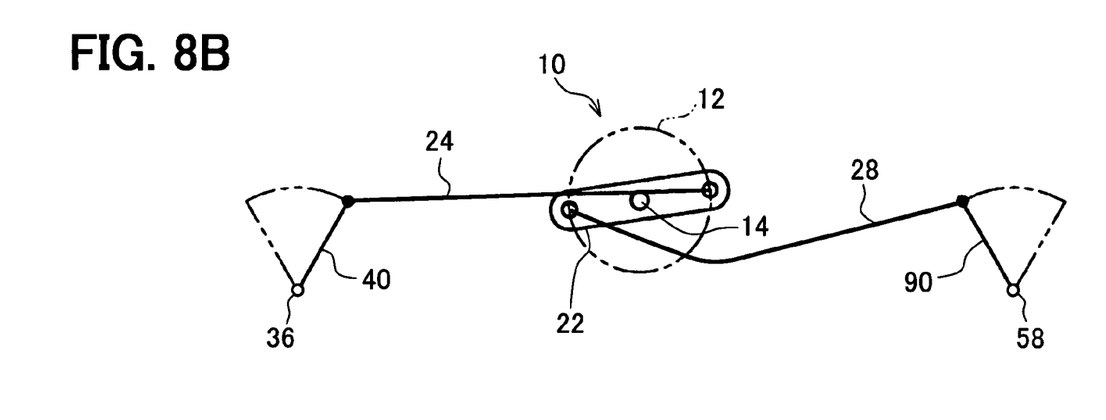

Specifically, in place of the four-bar linkage 48, as shown in FIGS. 8A and 8B, a pivot lever 90 may be used (in such a case, the pivot lever 40 serving as a first pivot lever of the present invention, and the pivot lever 90 serving as a second pivot lever of the present invention). Wiping directions of the two wiper arms 38, 82 are opposite to each other (i.e., forming an opposed type wiper system).

Furthermore, in the above embodiment, the other wiper arm 82 and the connecting lever 54 are formed as separate members, and the other wiper arm 82 is connected to the main lever 50 and the sub-lever 52 through the connecting lever 54. This construction may be modified as follows.

Specifically, the connecting lever 54 may be formed integrally with the other wiper arm 82 (i.e., the arm head at the base end portion of the wiper arm 82 serving as the connecting lever 54), and the connecting lever 54, which is formed integrally with the other wiper arm 82, is connected to the main lever 50 and the sub-lever 52.

Furthermore, in the above embodiment, the extended portion 74 extends from the one end portion of the lever main body 72. Alternatively, the extended portion 74 may extend from a longitudinal intermediate portion of the lever main body 72 in conformity with the wiping range of the other wiper arm 82.

Additional advantages and modifications will readily occur to those skilled in the art. The invention in its broader terms is therefore not limited to the specific details, representative apparatus, and illustrative examples shown and described.

What is claimed is:

1. A wiper system for a vehicle, comprising:
   first and second wiper arms that are placed one after another in a longitudinal direction of the wiper system;
   a wiper motor that includes an output shaft, which is reciprocally pivoted forward and backward upon energization of the wiper motor and outputs a drive force for driving the first and second wiper arms;
   a crank arm that is integrally pivotably fixed to the output shaft;
   first and second connecting rods are pivotably connected to first and second connecting points, respectively, of the crank arm, wherein the first and second connecting points are located on opposite sides, respectively, about a fixing point of the crank arm that is fixed to the output shaft, and the first and second connecting rods are reciprocally moved when the crank arm is reciprocally pivoted forward and backward by the output shaft;
   a first lever arrangement that is connected between the first connecting rod and the first wiper arm, wherein the first lever arrangement reciprocally pivots the first wiper arm relative to a body of the vehicle when the first connecting rod is reciprocally moved; and
   a second lever arrangement that is connected between the second connecting rod and the second wiper arm, wherein the second lever arrangement reciprocally pivots the second wiper arm relative to the body of the vehicle when the second connecting rod is reciprocally moved, wherein:
   the first lever arrangement includes:
      a pivot shaft that is pivotably supported relative to the body of the vehicle, wherein the first wiper arm is integrally pivotably fixed to the pivot shaft; and
      a pivot lever that is integrally pivotably fixed to the pivot shaft and is pivotably connected to the first connecting rod, wherein the pivot lever is placed on a predetermined side of the wiper system about the pivot shaft in a transverse direction of the wiper system, which is perpendicular to the longitudinal direction of the wiper system; and
   the second lever arrangement is pivotably supported relative to the body of the vehicle by first and second rotational shafts, which are spaced from each other, and includes:
      a main lever that is pivotably supported by the first rotational shaft and is pivotably connected to the second connecting rod, wherein the main lever is placed on the predetermined side of the wiper system about the first rotational shaft in the transverse direction of wiper system;

a sub-lever that is pivotably supported by the second rotational shaft, wherein the sub-lever is placed on the predetermined side of the wiper system about the second rotational shaft in the transverse direction of the wiper system; and a connecting lever that is pivotably connected to a swing end portion of the main lever at a first connecting point of the connecting lever and is pivotably connected to a swing end portion of the sub-lever at a second connecting point of the connecting lever spaced from the first connecting point of the connecting lever, wherein the second wiper arm is connected to the connecting lever.

2. The wiper system according to claim 1, wherein the main lever includes:

a first lever portion that is pivotably connected to the second connecting rod; and a second lever portion that is pivotably connected to the connecting lever and is displaced from the first lever portion in an axial direction of the first rotational shaft.

3. The wiper system according to claim 1, wherein the connecting lever includes:

a lever main body portion that is connected to the main lever and the sub-lever; and an extended portion that extends from the lever main body portion, wherein the second wiper arm is integrally pivotably fixed to the extended portion.

4. The wiper system according to claim 1, wherein:

the first and second connecting rods are connected to the crank arm on one axial side of the crank arm in an axial direction of the output shaft;

at least one of the first and second connecting rods has a bent portion that limits interference between the first and second connecting rods when the crank arm is reciprocally pivoted forward and backward; and the bent portion is bent in a direction that is perpendicular to the axial direction of the output shaft.

5. The wiper system according to claim 1, wherein at least one of the first and second connecting points of the crank arm, which are connected to the first and second connecting rods, respectively, is displaced from the fixing point of the crank arm in an axial direction of the output shaft.

6. The wiper system according to claim 1, further comprising a frame member that supports the wiper motor, wherein the output shaft extends through the frame member, and the wiper motor and the crank arm are placed on opposite sides, respectively, of the frame member in the axial direction of the output shaft.

7. The wiper system according to claim 1, further comprising first and second frame members, which are connected by a connecting frame, wherein:

the first frame member supports the wiper motor and the first lever arrangement and is adapted to be fixed to the body of the vehicle; and the second frame member supports the second lever arrangement and is adapted to be fixed to the body of the vehicle.

8. The wiper system according to claim 7, wherein the first frame member includes a pivot holder, which is formed integrally with the first frame member and pivotably holds the pivot shaft.

9. The wiper system according to claim 7, wherein:

at least one of the first and second connecting rods has a bent portion that limits interference between the first and second connecting rods when the crank arm is reciprocally pivoted forward and backward;

the bent portion is bent in a direction that is perpendicular to an axial direction of the output shaft;

a first connecting point of the at least one of the first and second connecting rods, which is pivotably connected to a corresponding one of the first and second connecting points of the crank arm, is further spaced from the connecting frame in comparison to an apex of the bent portion; and a second connecting point of the at least one of the first and second connecting rods, which is pivotably connected to a corresponding one of the first lever arrangement and the second lever arrangement, is further spaced from the connecting frame in comparison to the apex of the bent portion.

10. The wiper system according to claim 1, wherein:

the output shaft of the wiper motor is reciprocally pivoted forward and backward within a predetermined angular range, which is smaller than 180 degrees, upon the energization of the wiper motor to pivot the crank arm within the predetermined angular range; and at least one of the first and second connecting rods are arranged such that a first connecting point of the at least one of the first and second connecting rods pivotably connected to a corresponding one of the first and second connecting points of the crank arm does not cross a corresponding imaginary line, which connects between a rotational axis of the output shaft of the wiper motor and a second connecting point of the at least one of the first and second connecting rods pivotably connected to a corresponding one of the first lever arrangement and the second lever arrangement, when the crank arm is driven by the output shaft of the wiper motor to pivot within the predetermined angular range.

\* \* \* \* \*